US012690099B2

(12) United States Patent
Li et al.

(10) Patent No.: US 12,690,099 B2

(45) Date of Patent: Jul. 21, 2026

(54) LED LIGHT ADJUSTMENT MODULE CAPABLE OF ADJUSTING COLOR TEMPERATURE AND POWER

(71) Applicant: Light Emission Technology, Ltd, Shenzhen (CN)

(72) Inventors: Xiaohui Li, Shenzhen City (CN); Bin Lai, Nanchong City (CN); Yonghong Guan, Elmhurst, NY (US); Xiaofen Peng, Ganzhou City (CN); Jianjun Lai, Ganzhou City (CN)

( * ) Notice: Subject to any disclaimer, the term of this patent is extended or adjusted under 35 U.S.C. 154(b) by 111 days.

(21) Appl. No.: 18/674,394

(22) Filed: May 24, 2024

(65) Prior Publication Data

US 2025/0212301 A1 Jun. 26, 2025

(30) Foreign Application Priority Data

Dec. 21, 2023 (CN) ........................ 202311763472.8

(51) Int. Cl.

*H05B 45/20* (2020.01)

*H05B 45/345* (2020.01)

(52) U.S. Cl.

CPC ........... *H05B 45/20* (2020.01); *H05B 45/345* (2020.01)

(58) Field of Classification Search

CPC ........ H05B 45/10; H05B 45/20; H05B 45/30; H05B 45/325; H05B 45/345; H05B 47/10

See application file for complete search history.

(56) References Cited

U.S. PATENT DOCUMENTS

2025/0159774 A1* 5/2025 Lin ........................ H05B 45/20

FOREIGN PATENT DOCUMENTS

CN 120152096 A * 6/2025 ............. H05B 47/19

* cited by examiner

*Primary Examiner* — Jimmy T Vu

(74) *Attorney, Agent, or Firm* — Sandy Lipkin

(57) ABSTRACT

The present invention relates to the technical field of LED control, in particular to an LED light adjustment module. The module comprises an LED power unit, a color temperature adjusting module and a control unit, wherein the LED power unit comprises a rectifier filter module and a boost constant current module; the control unit comprises an energy supply module and a control module. A color temperature adjusting position laser point C and a power position laser point P are arranged on the surface of a lamp; a chip U4 is arranged at the point C and triggered by a magnet at the laser point C to switch the color temperature; a chip U5 is arranged at the point P and triggered by a magnet at the laser point P to switch the power, so that the color temperature and power can be easily adjusted without disassembling of the lamp.

9 Claims, 5 Drawing Sheets

LED LIGHT ADJUSTMENT MODULE CAPABLE OF ADJUSTING COLOR TEMPERATURE AND POWER

REFERENCE TO PRIOR APPLICATION

This application claims priority to Chinese Patent Application 202311763472.8, filed on Dec. 21, 2023, which is incorporated herein by reference.

TECHNICAL FIELD

The present invention relates to the technical field of LED control, in particular to an LED light adjustment module.

BACKGROUND

LED lighting modules have flexible color temperature and brightness adjusting functions, can perform adjustment according to the needs of different commercial areas. Light adjusting technology can enable LED lighting modules to have better lighting effect and energy-saving performance. Therefore, LED lighting modules, as energy-saving, environmentally friendly and long-life lighting equipment, are widely applied to homes and commercial places.

For example, in CN113825275A, a present invention relates to an integrated multifunctional driving power supply for LED lamps, and comprises a driving power supply casing, wherein a main control board is arranged in the driving power supply casing, and comprises a driving power module for supplying power to an LED lamps, a light adjusting module for adjusting the light of the LED lamp, and a color temperature adjusting module for adjusting the color temperature of the LED lamp; an MCU processor for performing signal processing is arranged in the driving power module; a light adjusting signal interface of the light adjusting module is connected to a light adjusting port of the driving power module; a light adjusting signal output terminal of the light adjusting module is connected to a light adjusting power signal input terminal of the LED lamp; a color temperature adjusting signal interface of the color temperature adjusting module is connected to an LED output port of driving power module; a color temperature adjusting signal input terminal of the color temperature adjusting module is connected to a color temperature adjusting signal receiving terminal of the LED lamp. In the present invention, the brightness and color temperature is adjusted through a light adjusting toggle switch and a color temperature adjusting toggle switch, and the LED power is adjusted through an external controller for sensing or an external active light regulator interface. However, the toggle switch is relatively large, and when an LED lighting module is designed, the toggle switch often takes up a larger space, which is not conducive to the miniaturization of the LED lighting module. At the same time, the surface aesthetics is also affected.

In order to eliminate the toggle switch and realize color temperature and power adjustment of the LED lighting module, an LED light adjustment module capable of adjusting color temperature and power is provided.

SUMMARY

The present invention aims at providing an LED light adjustment module capable of adjusting color temperature and power, so as to solve the problems raised in the aforementioned background.

In order to realize the aforementioned purpose, the present invention aims at providing an LED light adjustment module capable of adjusting color temperature and power. The LED light adjustment module comprises an LED power unit, a color temperature adjusting module and a control unit, wherein the LED power unit comprises a rectifier filter module and a boost constant current module; the control unit comprises an energy supply module and a control module; the energy supply module is connected to the control module; the control module is connected to the boost constant current module and the color temperature adjusting module; the rectifier filter module is connected to the boost constant current module; the boost constant current module is connected to the color temperature adjusting module; the control module is driven in a magnetic induction manner to adjust the color temperature adjusting module to realize the color temperature adjustment of LED light; moreover, the control module realizes the power adjustment of the LED light by changing the duty cycle of the output of the boost constant current module.

As a further improvement of the technical solution, the rectifier filter module comprises diodes D1, D2, D3 and D4, wherein one terminal of the diode D1 is connected to the diode D2, and capacitors C1, C15, CE1, CE2 and CE3 and connected to a terminal VCC; the other terminal of the diode D1 is connected to the diode D3, a resistor RV1 and connected to a terminal AC1; the diode D3 is connected to the diode D4 and connected to the other terminal of the capacitor C1, the other terminal of the capacitor C15, the other terminal of the capacitor CE1, the other terminal of the capacitor CE2, and the other terminal of the capacitor CE3; the diode D4 is connected to the other terminal of the diode D2 and the other terminal of the resistor RV1 and connected to a terminal AC2.

As a further improvement of the technical solution, the diodes D1, D2, D3 and D4 are all Schottky diodes.

As a further improvement of the technical solution, the boost constant current module comprises a chip U1 and MOS transistor Q1, wherein

- the pin Vdd of the chip U1 is connected to a capacitor C2 and connected to a capacitor C4;
- the pin PWM of the chip U1 is connected to a resistor R1 and connected to a resistor R2; the resistor R1 is connected to the other terminal of the diode D1, and a resistor R3 and connected to an inductor L1; the inductor L1 is connected to a diode D5 and a resistor R19 and connected to the drain electrode of the MOS transistor Q1; the resistor R19 is connected to a capacitor C14; the resistor R2 is connected to a terminal PWM;
- the pin C of the chip U1 is connected to a capacitor C3; the pin Ep of the chip U1 is connected to the other terminal of the capacitor C3, the other terminal of the diode D3, resistors R5, R6, R7, R9, R10, R11, R14 and R15, a diode D6 and a capacitor CE4 and connected to a terminal C;
- the pin Vin of the chip U1 is connected to the other terminal of the resistor R3;
- the pin GATE of the chip U1 is connected to a resistor R4, and the resistor R4 is connected to the gate electrode of the MOS transistor Q1;
- the pin CS of the chip U1 is connected to the source electrode of the MOS transistor Q1 and connected to the other terminal of the resistor R5, the other terminal of the resistor R6, and the other terminal of the resistor R7;

the pin IF of the chip U1 is connected to the other terminal of the resistor R10, the other terminal of the resistor R14, the other terminal of the resistor R15, the other terminal of the diode D6 and connected to a terminal B;

the pin VF of the chip U1 is connected to a resistor R8 and connected to the other terminal of a resistor R9; the resistor R8 is connected to the other terminal of the diode D5, the other terminal of the capacitor C14, the other terminal of the resistor R1*l*, and the other terminal of the capacitor CE4 and connected to a terminal A.

As a further improvement of the technical solution, the MOS transistor Q1 is an N-channel MOS transistor.

As a further improvement of the technical solution, the color temperature adjusting module comprises a common mode inductor L3 and MOS transistors Q2 and Q3, wherein the pin 1 of the common mode inductor L3 is connected to a capacitor C5 and connected to a terminal LED+;

the pin 2 of the common mode inductor L3 is connected to resistors R12 and R13, the source electrode of the MOS transistor Q2 and the source electrode of the MOS transistor Q3 and connected to the other terminal of the capacitor C5; the gate electrode of the MOS transistor Q2 is connected to the other terminal of the resistor R12 and connected to a terminal C−; the drain electrode of the MOS transistor Q2 is connected to a terminal LEDC−; the gate electrode of the MOS transistor Q3 is connected to the other terminal of the resistor R13 and connected to a terminal W−; the drain electrode of the MOS transistor Q3 is connected to a terminal LEDW−;

the pin 3 of the common mode inductor L3 is connected to a terminal B, and the pin 4 of the common mode inductor L3 is connected to a capacitor C16 and connected to the terminals A and C.

As a further improvement of the technical solution, the energy supply module comprises a chip U2, the pin IN of the chip U2 is connected to a capacitor C7 and connected to the terminal VCC;

the pin OUT of the chip U2 is connected to a capacitor C8 and connected to a terminal 3.3V;

the pin GND of the chip U2 is connected to the other terminal of the capacitor C7 and the other terminal of the capacitor C8 and grounded.

As a further improvement of the technical solution, the control module comprises chips U3, U4 and U5, wherein the pin VDD of the chip U1 is connected to a capacitor C9, a resistor R16 and the terminal 3.3V;

The pin PA0 of the chip U1 is connected to a resistor R18, and the resistor R18 is connected to the terminal W−;

the pin PA1 of the chip U1 is connected to a capacitor C12 and connected to the pin OUTPUT of the chip U5;

the pin PA2 of the chip U1 is connected to a capacitor C10 and connected to the pin OUTPUT of the chip U4;

the pin PA3 of the chip U1 is connected to the other terminal of the resistor R16;

the pin PA4 of the chip U1 is connected to the terminal PWM;

the pin PA5 of the chip U1 is connected to a resistor R17, and the resistor R17 is connected to the terminal C−;

the pin VSS of the chip U1 is grounded;

the pin VDD pin of the chip U4 is connected to a capacitor C11 and connected to the terminal 3.3V;

the pin VDD of the chip U5 is connected to a capacitor C13 and connected to the terminal 3.3V; both the pin GND of the chip U4 and the pin GND of the chip U5 are connected to the other terminal of the capacitor C9, the other terminal of the capacitor C10, the other terminal of the capacitor C11, the other terminal of the capacitor C12 and the other terminal of the capacitor C13 and grounded.

As a further improvement of the technical solution, both the chips U4 and U5 are Hall magnetic control chips.

Compared with the prior art, the present invention has the beneficial effects that in this LED light adjustment module capable of adjusting color temperature and power, a color temperature adjusting position laser point C and a power position laser point P are arranged on the surface of a lamp; a chip U4 is arranged at the point C, and is triggered by a magnet at the laser point C on the lamp to switch the color temperature; a chip U5 is arranged at the point P, and is triggered by a magnet at the laser point P on the lamp to switch the power, so that the color temperature and power can be easily adjusted without disassembling of the lamp.

DETAILED DESCRIPTION OF EMBODIMENTS

The technical solutions in the embodiments of the present invention will be clearly and completely described below in conjunction with the accompanying drawings in the embodiments of the present invention, and it is clear that the embodiments described are a part of the embodiments of the present invention, and not all of them. Based on the embodiments of the present invention, all other embodiments obtained by a person skilled in the art without inventive work shall fall within the scope of protection of the present invention.

Figure 1:
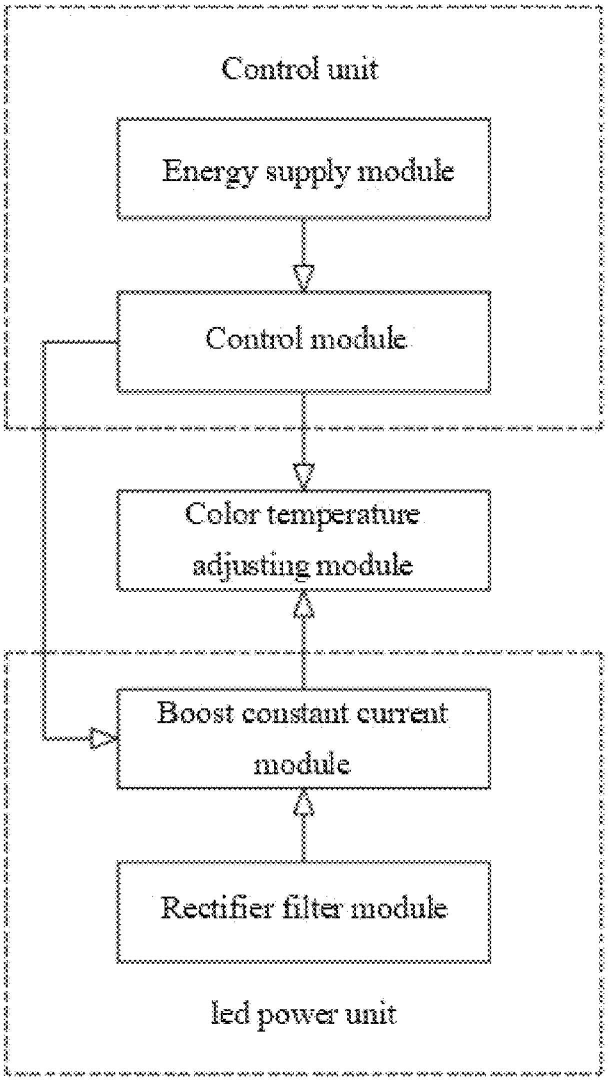
FIG. 1 is a schematic diagram of the overall structure of the present invention.
Figure 2:
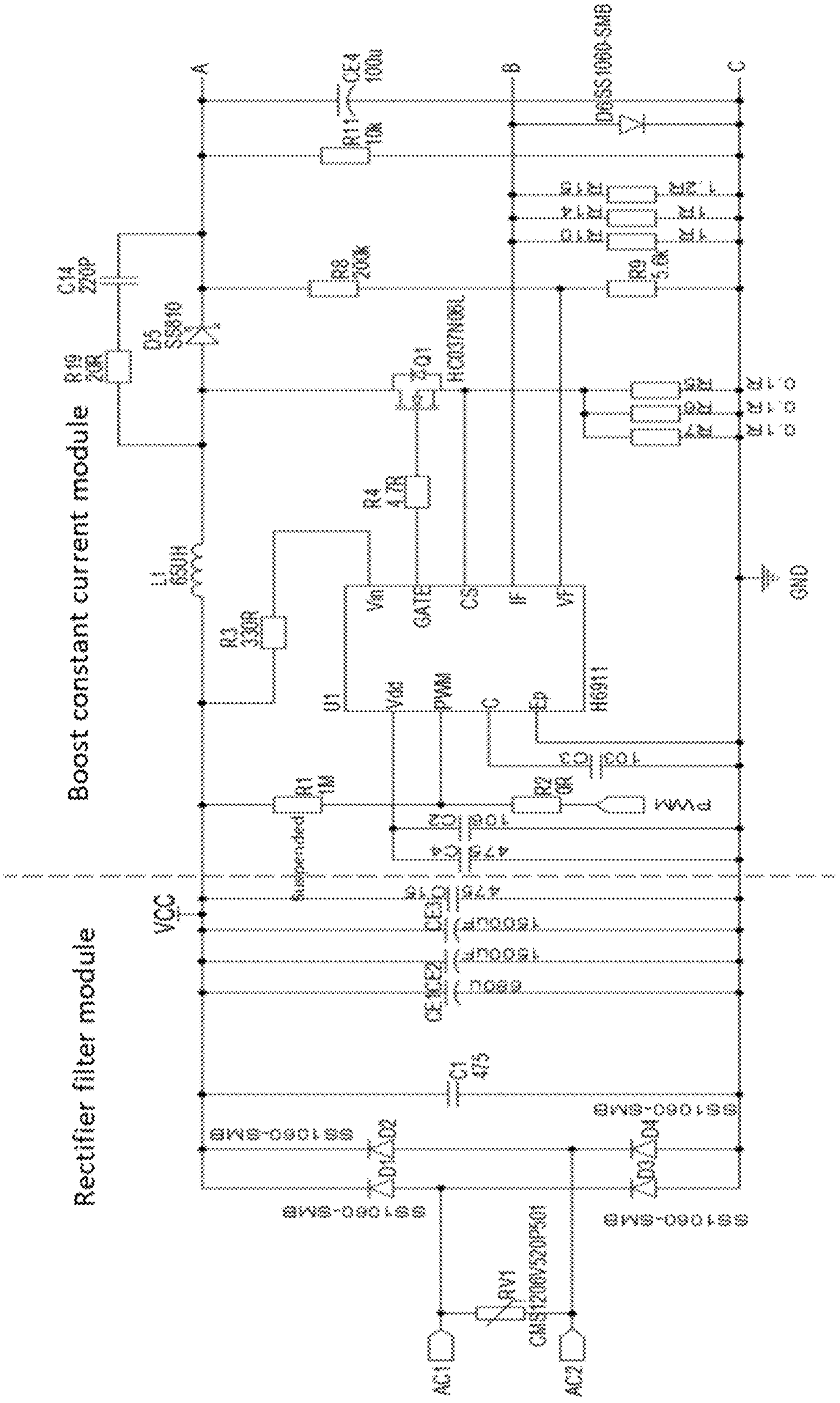
FIG. 2 is a circuit diagram of the LED power unit of the present invention.
Figure 3:
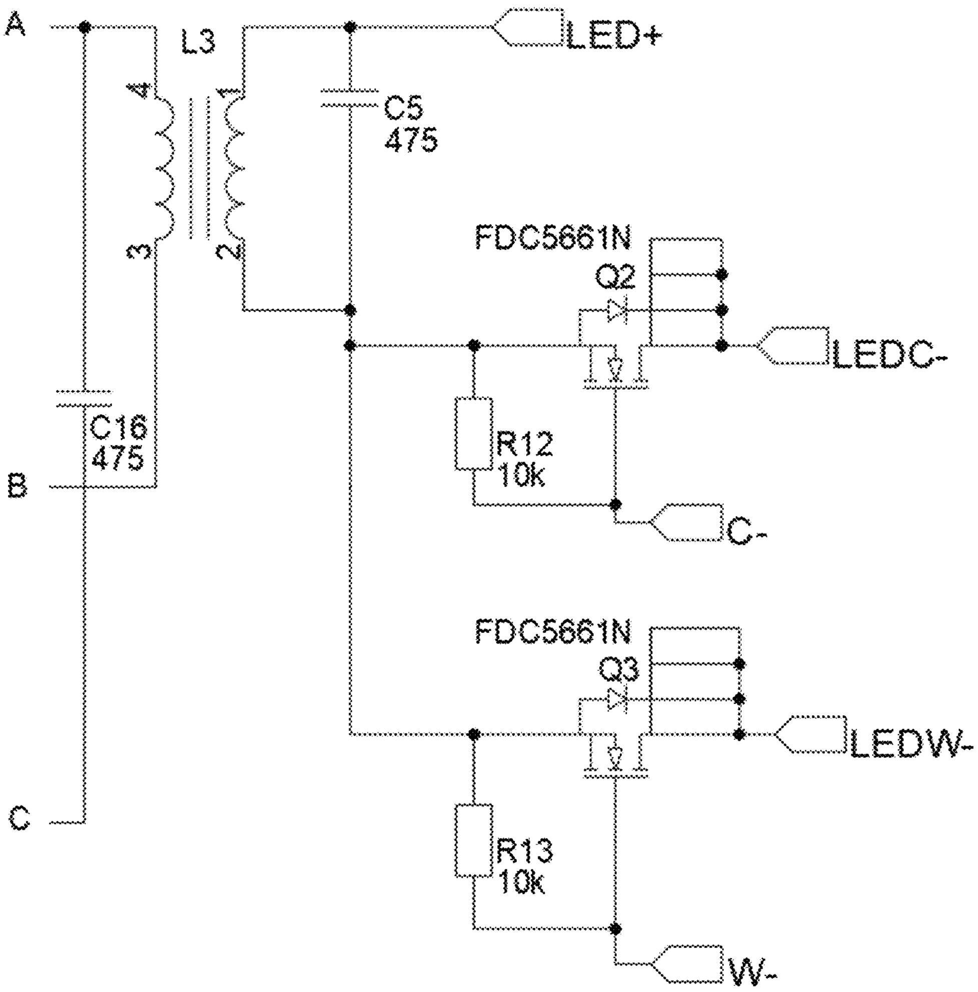
FIG. 3 is a circuit diagram of the color temperature adjusting module of the present invention.
Figure 4:
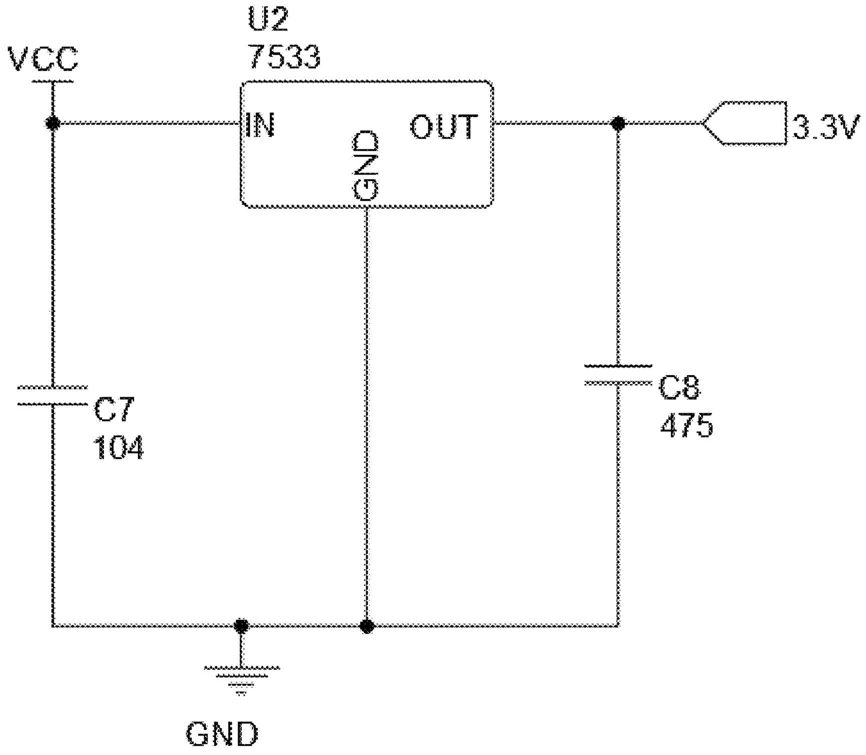
FIG. 4 is a circuit diagram of the energy supply module of the present invention.
Figure 5:
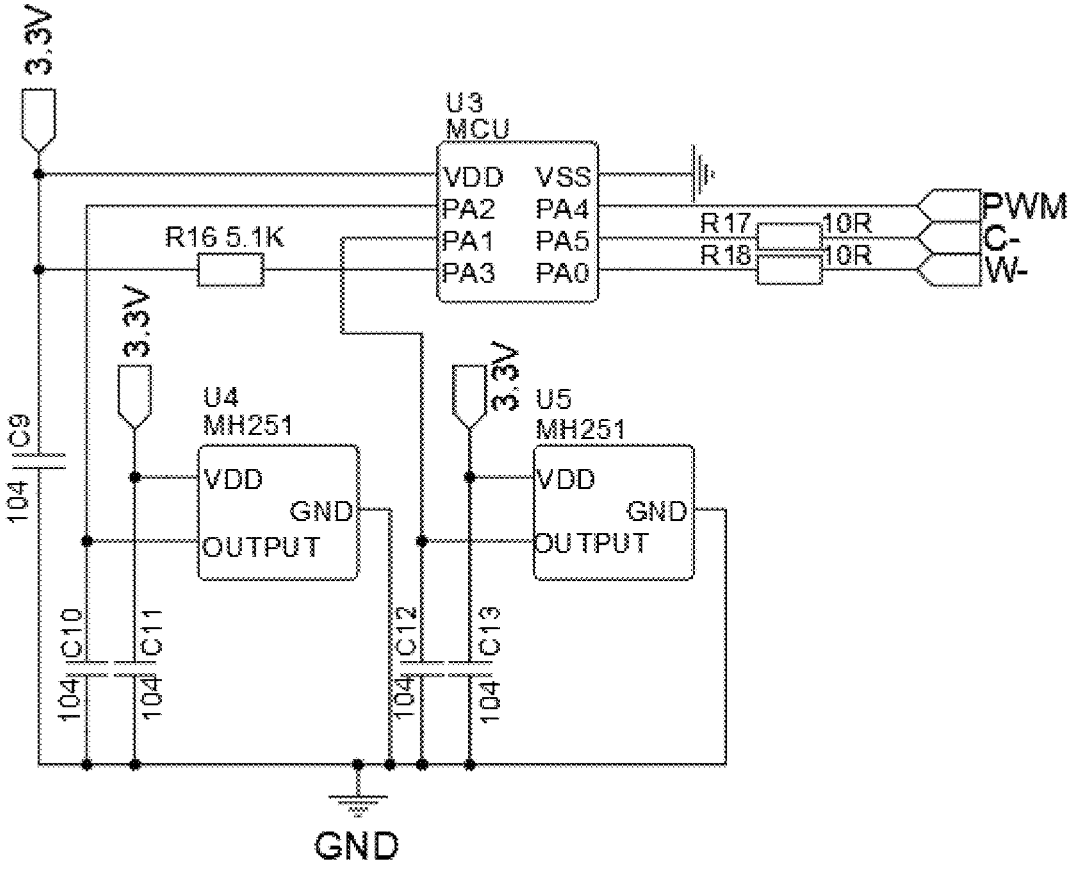
FIG. 5 is a circuit diagram of the control module of the present invention.

Please refer to FIGS. 1 to 5. The embodiment aims at providing an LED light adjustment module capable of adjusting color temperature and power, which comprises an LED power unit, a color temperature adjusting module and a control unit, wherein the LED power unit comprises a rectifier filter module and a boost constant current module; the control unit comprises an energy supply module and a control module; the energy supply module is connected to the control module; the control module is connected to the boost constant current module and the color temperature adjusting module; the rectifier filter module is connected to the boost constant current module; the boost constant current module is connected to the color temperature adjusting module;

the control module is driven in a magnetic induction manner to adjust the color temperature adjusting module to realize the color temperature adjustment of LED light; moreover, the control module realizes the power adjustment of the LED light by changing the duty cycle of the output of the boost constant current module.

The rectifier filter module comprises diodes D1, D2, D3 and D4, wherein one terminal of the diode D1 is connected to the diode D2, and capacitors C1, C15, CE1, CE2 and CE3 and connected to a terminal VCC; the other terminal of the diode D1 is connected to the diode D3, a resistor RV1 and connected to a terminal AC1; the diode D3 is connected to the diode D4 and connected to the other terminal of the capacitor C1, the other terminal of the capacitor C15, the other terminal of the capacitor CE1, the other terminal of the capacitor CE2, and the other terminal of the capacitor CE3; the diode D4 is connected to the other terminal of the diode D2 and the other terminal of the resistor RV1 and connected to a terminal AC2.

In the circuit, the diodes D1, D2, D3 and D4, as rectifier bridges, are matched with the capacitors C1, C15, CE1, CE2 and CE3 to rectify and filter the input AC alternating current, thereby supplying power to the boost constant current module.

The diodes D1, D2, D3 and D4 are all Schottky diodes. In the present invention, SS1060-SMB type chip Schottky diodes are preferably used, which have the advantages of high switching speed, low reverse leakage current, and high-temperature stability. More importantly, the chip Schottky diode is an efficient, reliable, and compact electronic element. When being used in lighting module design, the chip Schottky diode is conducive to the miniaturization of lighting modules.

The boost constant current module comprises a chip U1 and an MOS transistor Q1, wherein

- the pin Vdd of the chip U1 is connected to a capacitor C2 and connected to a capacitor C4;
- the pin PWM of the chip U1 is connected to a resistor R1 and connected to a resistor R2; the resistor R1 is connected to the other terminal of the diode D1, and a resistor R3 and connected to an inductor L1; the inductor L1 is connected to a diode D5 and a resistor R19 and connected to the drain electrode of the MOS transistor Q1; the resistor R19 is connected to a capacitor C14; the resistor R2 is connected to a terminal PWM;
- the pin C of the chip U1 is connected to a capacitor C3; the pin Ep of the chip U1 is connected to the other terminal of the capacitor C3, the other terminal of the diode D3, resistors R5, R6, R7, R9, R10, R11, R14 and R15, a diode D6 and a capacitor CE4 and connected to a terminal C;
- the pin Vin of the chip U1 is connected to the other terminal of the resistor R3;
- the pin GATE of the chip U1 is connected to a resistor R4, and the resistor R4 is connected to the gate electrode of the MOS transistor Q1;
- the pin CS of the chip U1 is connected to the source electrode of the MOS transistor Q1 and connected to the other terminal of the resistor R5, the other terminal of the resistor R6, and the other terminal of the resistor R7;
- the pin IF of the chip U1 is connected to the other terminal of the resistor R10, the other terminal of the resistor R14, the other terminal of the resistor R15, the other terminal of the diode D6 and connected to a terminal B;
- the pin VF of the chip U1 is connected to a resistor R8 and connected to the other terminal of a resistor R9; the resistor R8 is connected to the other terminal of the diode D5, the other terminal of the capacitor C14, the other terminal of the resistor R11, and the other terminal of the capacitor CE4 and connected to a terminal A.

The chip U1 is a H6911 boost constant current chip. This circuit is a boost constant current circuit composed of the chip U1. The voltage required is provided through the boost constant current circuit, so that the lighting module can work normally.

The MOS transistor Q1 is an N-channel MOS transistor. The present invention preferably uses HC037N06L type chip MOS transistors, and has the advantages of high switching speed, low on resistance and low power consumption.

The color temperature adjusting module comprises a common mode inductor L3 and MOS transistors Q2 and Q3, wherein

- the pin 1 of the common mode inductor L3 is connected to a capacitor C5 and connected to a terminal LED+;
- the pin 2 of the common mode inductor L3 is connected to resistors R12 and R13, the source electrode of the MOS transistor Q2 and the source electrode of the MOS transistor Q3 and connected to the other terminal of the capacitor C5; the gate electrode of the MOS transistor Q2 is connected to the other terminal of the resistor R12 and connected to a terminal C−; the drain electrode of the MOS transistor Q2 is connected to a terminal LEDC−; the gate electrode of the MOS transistor Q3 is connected to the other terminal of the resistor R13 and connected to a terminal W−; the drain electrode of the MOS transistor Q3 is connected to a terminal LEDW−;
- the pin 3 of the common mode inductor L3 is connected to a terminal B, and the pin 4 of the common mode inductor L3 is connected to a capacitor C16 and connected to the terminals A and C.

The MOS transistors Q2 and Q3 are both FDC5661N type N-channel MOS transistors, with high rated voltage and rated current. The circuit is a two-way color temperature adjusting MOS transistor circuit composed of the MOS transistors Q1 and Q2. The boost constant current module adjusts the brightness of the LED lighting module by adjusting the output voltage of the terminal LED+, and the control module adjusts the color temperature of the LED lighting module through the MOS transistors Q2 and Q3.

the energy supply module comprises a chip U2;

- the pin IN of the chip U2 is connected to a capacitor C7 and connected to the terminal VCC;
- the pin OUT of the chip U2 is connected to a capacitor C8 and connected to a terminal 3.3V;
- the pin GND of the chip U2 is connected to the other terminal of the capacitor C7 and the other terminal of the capacitor C8 and grounded.

The control module comprises chips U3, U4 and U5, wherein

- the pin VDD of the chip U1 is connected to a capacitor C9, a resistor R16 and the terminal 3.3V;
- the pin PA0 of the chip U1 is connected to a resistor R18, and the resistor R18 is connected to the terminal W−;
- the pin PA1 of the chip U1 is connected to a capacitor C12 and connected to the pin OUTPUT of the chip U5;
- the pin PA2 of the chip U1 is connected to a capacitor C10 and connected to the pin OUTPUT of the chip U4;
- the pin PA3 of the chip U1 is connected to the other terminal of the resistor R16;
- the pin PA4 of the chip U1 is connected to the terminal PWM;
- the pin PA5 of the chip U1 is connected to a resistor R17, and the resistor R17 is connected to the terminal C−;
- the pin VSS of the chip U1 is grounded;
- the pin VDD pin of the chip U4 is connected to a capacitor C11 and connected to the terminal 3.3V;

the pin VDD of the chip U5 is connected to a capacitor C13 and connected to the terminal 3.3V; both the pin GND of the chip U4 and the pin GND of the chip U5 are connected to the other terminal of the capacitor C9, the other terminal of the capacitor C10, the other terminal of the capacitor C11, the other terminal of the capacitor C12 and the other terminal of the capacitor C13 and grounded.

Both the chips U4 and U5 are Hall magnetic control chips. In the present invention, an MH251 full-pole Hall switch chip is preferably used, with low operating power consumption. The energy supply module adopts a 3.3V voltage stabilizing circuit, and provides stable 3.3V power supply to the control module. In the control module, the chip U3 is taken as an MCU; the pins PA1 and PA2 of the chip U3 are connected to the Hall switch signal input from the chips U4 and U5; the pins PA0 and PA5 of chip U3 are two-way color temperature adjusting signal output; the pin PA4 of the chip U3 is the power signal output.

In the present invention, a color temperature adjusting position laser point C and a power position laser point P are arranged on the surface of a lamp; a chip U4 is arranged at the point C, and is triggered by a magnet at the laser point C on the lamp to switch the color temperature; a chip U5 is arranged at the point P, and is triggered by a magnet at the laser point P on the lamp to switch the power, so that the color temperature and power can be easily adjusted without disassembling of the lamp. The specific operation process is as follows:

The chip U1 is used to realize boost constant current. When the magnet is close to the chip U4, the pin OUTPUT of chip U4 outputs a low level. When the pin PA2 of the chip U3 detects a low level signal, the pin PA0 output of the chip U3 drives the MOS transistor Q3 to drive the color temperature of a LED lamp to change to low K (such as 2700K), or the pin PA5 output of the chip U3 drives MOS transistor Q2 to enable the temperature color of the LED lamp to change to high K (such as 3000K) to achieve color temperature adjustment;

When the magnet is close to the chip U5, the pin OUTPUT of the U5 outputs a low level. When the pin PA1 of the chip U3 detects a low level signal, the pin PA4 pin of the chip outputs a signal to adjust the duty cycle of the chip U1 to realize LED brightness adjustment. It is worth noting that LED brightness adjustment adopts a cycle in three ranges, from a low range (power 4 W) to a middle range (power 5 W) to a high range (power 7 W). The duty cycle of the corresponding chip U1 is larger and larger, and the brightness of the LED lamp is higher and higher.

The aforementioned contents display and describe the basic principle, main features and advantages of the present invention. Those skilled in the industry should understand that the present invention is not limited by the aforementioned embodiments. The aforementioned embodiments and contents described in the specification are only preferred examples of the present invention and are not intended to limit the present invention. There will be various variations and improvements in the present invention without departing from the spirit and scope of the present invention, and these variations and improvements all fall within the protection scope of patent claims of the present invention. The protection scope of patent claims of the present invention is defined by the appended claims and their equivalents.

What is claimed is:

1. An LED light adjustment module configured to adjust color temperature and power, characterized by comprising an LED power unit, a color temperature adjusting module and a control unit, wherein the LED power unit comprises a rectifier filter module and a boost constant current module; the control unit comprises an energy supply module and a control module; the energy supply module is connected to the control module; the control module is connected to the boost constant current module and the color temperature adjusting module; the rectifier filter module is connected to the boost constant current module; the boost constant current module is connected to the color temperature adjusting module; the control module is driven in a magnetic induction manner to adjust the color temperature adjusting module to realize the color temperature adjustment of LED light; and wherein the control module realizes the power adjustment of the LED light by changing the duty cycle of the output of the boost constant current module.

2. The LED light adjustment module configured to adjust color temperature and power according to claim 1, characterized in that the rectifier filter module comprises diodes D1, D2, D3 and D4, wherein one terminal of the diode D1 is connected to the diode D2, and capacitors C1, C15, CE1, CE2 and CE3 and connected to a terminal VCC; the other terminal of the diode D1 is connected to the diode D3, a resistor RV1 and connected to a terminal AC1; the diode D3 is connected to the diode D4 and connected to the other terminal of the capacitor C1, the other terminal of the capacitor C15, the other terminal of the capacitor CE1, the other terminal of the capacitor CE2, and the other terminal of the capacitor CE3; the diode D4 is connected to the other terminal of the diode D2 and the other terminal of the resistor RV1 and connected to a terminal AC2.

3. The LED light adjustment module configured to adjust color temperature and power according to claim 2, characterized in that the diodes D1, D2, D3, and D4 are all Schottky diodes.

4. The LED light adjustment module configured to adjust color temperature and power according to claim 2, characterized in that the boost constant current module comprises a chip U1 and an MOS transistor Q1, wherein the pin Vdd of the chip U1 is connected to a capacitor C2 and connected to a capacitor C4; the pin PWM of the chip U1 is connected to a resistor R1 and connected to a resistor R2; the resistor R1 is connected to the other terminal of the diode D1, and a resistor R3 and connected to an inductor L1; the inductor L1 is connected to a diode D5 and a resistor R19 and connected to the drain electrode of the MOS transistor Q1; the resistor R19 is connected to a capacitor C14; the resistor R2 is connected to a terminal PWM; the pin C of the chip U1 is connected to a capacitor C3; the pin Ep of the chip U1 is connected to the other terminal of the capacitor C3, the other terminal of the diode D3, resistors R5, R6, R7, R9, R10, R11, R14 and R15, a diode D6 and a capacitor CE4 and connected to a terminal C; the pin Vin of the chip U1 is connected to the other terminal of the resistor R3; the pin GATE of the chip U1 is connected to a resistor R4, and the resistor R4 is connected to the gate electrode of the MOS transistor Q1; the pin CS of the chip U1 is connected to the source electrode of the MOS transistor Q1 and connected to the other terminal of the resistor R5, the other terminal of the resistor R6, and the other terminal of the resistor R7; the pin IF of the chip U1 is connected to the other terminal of the resistor R10, the other terminal of the resistor R14, the other terminal of the resistor R15, the other terminal of the diode D6 and connected to a terminal B; the pin VF of the chip U1 is connected to a resistor R8 and connected to the other terminal of a resistor R9; the resistor R8 is connected to the other terminal of the diode D5, the other terminal of the capacitor C14, the other terminal of the resistor R11, and the other terminal of the capacitor CE4 and connected to a terminal A.

5. The LED light adjustment module configured to adjust color temperature and power according to claim 4, characterized in that the MOS transistor Q1 is an N-channel MOS transistor.

6. The LED light adjustment module configured to adjust color temperature and power according to claim 4, characterized in that the color temperature adjusting module comprises a common mode inductor L3 and MOS transistors Q2 and Q3, wherein the pin 1 of the common mode inductor L3 is connected to a capacitor C5 and connected to a terminal LED+; the pin 2 of the common mode inductor L3 is connected to resistors R12 and R13, the source electrode of the MOS transistor Q2 and the source electrode of the MOS transistor Q3 and connected to the other terminal of the capacitor C5; the gate electrode of the MOS transistor Q2 is connected to the other terminal of the resistor R12 and connected to a terminal C-; the drain electrode of the MOS transistor Q2 is connected to a terminal LEDC-; the gate electrode of the MOS transistor Q3 is connected to the other terminal of the resistor R13 and connected to a terminal W-; the drain electrode of the MOS transistor Q3 is connected to a terminal LEDW-; the pin 3 of the common mode inductor L3 is connected to a terminal B, and the pin 4 of the common mode inductor L3 is connected to a capacitor C16 and connected to the terminals A and C.

7. The LED light adjustment module configured to adjust color temperature and power according to claim 6, characterized in that the energy supply module comprises a chip U2; the pin IN of the chip U2 is connected to a capacitor C7 and connected to the terminal VCC; the pin OUT of the chip U2 is connected to a capacitor C8 and connected to a terminal 3.3V; the pin GND of the chip U2 is connected to the other terminal of the capacitor C7 and the other terminal of the capacitor C8 and grounded.

8. The LED light adjustment module configured to adjust color temperature and power according to claim 1, characterized in that the control module comprises chips U3, U4 and U5, wherein the pin VDD of the chip U1 is connected to a capacitor C9, a resistor R16 and the terminal 3.3V; The pin PA0 of the chip U1 is connected to a resistor R18, and the resistor R18 is connected to the terminal W−; the pin PA1 of the chip U1 is connected to a capacitor C12 and connected to the pin OUTPUT of the chip U5; the pin PA2 of the chip U1 is connected to a capacitor C10 and connected to the pin OUTPUT of the chip U4; the pin PA3 of the chip U1 is connected to the other terminal of the resistor R16; the pin PA4 of the chip U1 is connected to the terminal PWM; the pin PA5 of the chip U1 is connected to a resistor R17, and the resistor R17 is connected to the terminal C−; the pin VSS of the chip U1 is grounded; the pin VDD pin of the chip U4 is connected to a capacitor C11 and connected to the terminal 3.3V; the pin VDD of the chip U5 is connected to a capacitor C13 and connected to the terminal 3.3V; both the pin GND of the chip U4 and the pin GND of the chip U5 are connected to the other terminal of the capacitor C9, the other terminal of the capacitor C10, the other terminal of the capacitor C11, the other terminal of the capacitor C12 and the other terminal of the capacitor C13 and grounded.

9. The LED light adjustment module configured to adjust color temperature and power according to claim 8, characterized in that both the chips U4 and U5 are Hall magnetic control chips.

* * * * *